(12) United States Patent
Psota et al.

(10) Patent No.: US 10,949,450 B2
(45) Date of Patent: Mar. 16, 2021

(54) MTRANSACTION PROCESSING IMPROVEMENTS

(71) Applicant: Panjiva, Inc., New York, NY (US)

(72) Inventors: James Ryan Psota, Cambridge, MA (US); Jason Seth Prentice, Arlington, MA (US); Peter Goodings Swartz, Cambridge, MA (US); Timothy George Garnett, San Mateo, CA (US); Giulio Gueltrini, Cambridge, MA (US)

(73) Assignee: Panjiva, Inc., New York, NY (US)

( * ) Notice: Subject to any disclaimer, the term of this patent is extended or adjusted under 35 U.S.C. 154(b) by 209 days.

(21) Appl. No.: 16/209,887

(22) Filed: Dec. 4, 2018

(65) Prior Publication Data

US 2019/0171655 A1 Jun. 6, 2019

Related U.S. Application Data

(60) Provisional application No. 62/594,480, filed on Dec. 4, 2017, provisional application No. 62/596,898, filed on Dec. 10, 2017.

(51) Int. Cl.
*G06F 16/28* (2019.01)
*G06F 16/215* (2019.01)
(Continued)

(52) U.S. Cl.
CPC .......... *G06F 16/288* (2019.01); *G06F 16/215* (2019.01); *G06F 16/2379* (2019.01);
(Continued)

(58) Field of Classification Search
CPC ... G06F 16/288; G06F 16/2379; G06F 16/285
See application file for complete search history.

(56) References Cited

U.S. PATENT DOCUMENTS 5,570,291 A 10/1996 Dudle et al.
5,826,244 A 10/1998 Huberman
(Continued)

FOREIGN PATENT DOCUMENTS

CN 1499403 A 5/2004
CN 1822000 A 8/2006
(Continued)

OTHER PUBLICATIONS

"Adaptive Duplicate Detection Using Learnable String Similarity Measures", SIGKDD'03, Aug. 24-27, 2003, Washington, DC, USA., 10 pages (Year: 2003).*
(Continued)

*Primary Examiner* — Loc Tran
(74) *Attorney, Agent, or Firm* — Proskauer Rose LLP

(57) ABSTRACT

The technology features a system and computer-implemented method for resolving a relationship between objects. A target object index is generated based on a group of target objects. One or more lookup operations is performed on each target object in the target object index for each source object in a group of source objects. A plurality of source target object pairs is generated, each source target object pair comprising one source object and one target object having at least one matching data value. Each source target object pair is converted into a numeric feature vector. The numeric feature vector is classified corresponding to each source target object pair using a binary classifier. A match score to each source target object pair is applied based on the classification using the binary classifier. Any source target object pair having a match score lower than a match threshold value is discarded.

16 Claims, 6 Drawing Sheets

(51) Int. Cl.
*G06F 16/2457* (2019.01)
*G06F 16/23* (2019.01)
*G06Q 10/08* (2012.01)

(52) U.S. Cl.
CPC ...... *G06F 16/24578* (2019.01); *G06F 16/285* (2019.01); *G06Q 10/083* (2013.01)

(56) References Cited

U.S. PATENT DOCUMENTS

| | | | |
|---|---|---|---|
| 5,970,475 | A | 10/1999 | Barnes et al. |
| 5,987,429 | A | 11/1999 | Maritzen et al. |
| 6,035,017 | A | 3/2000 | Fenton et al. |
| 6,629,081 | B1 | 9/2003 | Cornelius et al. |
| 7,330,833 | B1 | 2/2008 | Robb et al. |
| 7,610,233 | B1 | 10/2009 | Leong et al. |
| 7,617,136 | B1 | 11/2009 | Lessing et al. |
| 7,912,865 | B2 | 3/2011 | Akerman et al. |
| 8,473,354 | B2 | 6/2013 | Psota et al. |
| 9,519,859 | B2 | 12/2016 | Huang et al. |
| 9,639,874 | B2 | 5/2017 | Psota et al. |
| 2001/0056379 | A1 | 12/2001 | Fujinaga et al. |
| 2002/0194050 | A1 | 12/2002 | Nabe et al. |
| 2003/0034879 | A1 | 2/2003 | Rangarajan et al. |
| 2003/0046220 | A1 | 3/2003 | Kamiya |
| 2003/0088562 | A1 | 5/2003 | Dillon et al. |
| 2003/0126146 | A1 | 7/2003 | Van Der Riet |
| 2003/0187716 | A1 | 10/2003 | Lee |
| 2003/0212609 | A1 | 11/2003 | Blair et al. |
| 2004/0039598 | A1 | 2/2004 | Kim |
| 2004/0109543 | A1 | 6/2004 | Engelsma et al. |
| 2004/0122942 | A1 | 6/2004 | Green et al. |
| 2004/0143600 | A1 | 7/2004 | Musgrove et al. |
| 2004/0162742 | A1 | 8/2004 | Stoker et al. |
| 2004/0236666 | A1 | 11/2004 | Clark et al. |
| 2004/0243503 | A1 | 12/2004 | Eng et al. |
| 2005/0021527 | A1 | 1/2005 | Zhang et al. |
| 2005/0144052 | A1 | 6/2005 | Harding et al. |
| 2007/0112671 | A1 | 5/2007 | Rowan |
| 2007/0239577 | A1 | 10/2007 | Grody et al. |
| 2007/0260521 | A1 | 11/2007 | Van Der Riet |
| 2008/0040329 | A1 | 2/2008 | Cussen et al. |
| 2008/0082528 | A1 | 4/2008 | Bonzi et al. |
| 2008/0120129 | A1 | 5/2008 | Seubert et al. |
| 2008/0162297 | A1 | 7/2008 | Hershkovitz et al. |
| 2008/0162347 | A1 | 7/2008 | Wagner |
| 2009/0144070 | A1 | 6/2009 | Psota et al. |
| 2009/0234814 | A1 | 9/2009 | Boerries et al. |
| 2009/0326995 | A1 | 12/2009 | Sorisi et al. |
| 2010/0094840 | A1 | 4/2010 | Donnelly |
| 2011/0137705 | A1 | 6/2011 | Srinivasan |
| 2011/0173093 | A1 | 7/2011 | Psota et al. |
| 2012/0191619 | A1 | 7/2012 | Gross |
| 2012/0203708 | A1 | 8/2012 | Psota et al. |
| 2012/0278399 | A1 | 11/2012 | Turner et al. |
| 2013/0073464 | A1 | 3/2013 | Magpayo et al. |
| 2013/0268403 | A1 | 10/2013 | Psota et al. |
| 2013/0317954 | A1 | 11/2013 | Psota et al. |
| 2014/0095353 | A1 | 4/2014 | Psota et al. |
| 2014/0143192 | A1 | 5/2014 | Nagakura |
| 2014/0156513 | A1 | 6/2014 | Psota et al. |
| 2014/0258032 | A1 | 9/2014 | Psota et al. |
| 2015/0073929 | A1 | 3/2015 | Psota et al. |
| 2015/0365349 | A1* | 12/2015 | Verma ...................... H04L 47/70 709/226 |
| 2017/0076153 | A1* | 3/2017 | Farre Guiu ........ H04N 21/8549 |
| 2017/0091320 | A1 | 3/2017 | Psota et al. |

FOREIGN PATENT DOCUMENTS

| | | |
|---|---|---|
| EP | 2212839 A4 | 6/2012 |
| EP | 2524299 A1 | 11/2012 |
| JP | H11160454 A | 6/1999 |
| KR | 20160022540 A | 3/2016 |
| WO | 2009065029 A1 | 5/2009 |
| WO | 2011085360 A1 | 7/2011 |
| WO | 2014146193 A1 | 9/2014 |

OTHER PUBLICATIONS

Huang et al.; "Learning Deep Structured Semantic Models for Web Search using Clickthrough Data;" ACM International Conference on Information and Knowledge Management (CIKM); Oct. 27-Nov. 1, 2013; San Francisco, CA; 6 pages.
Bilenko, et al., "Adaptive duplicate detection using learnable string similarity measures", Internet Citation, Aug. 2003 (Aug. 2003), XP002475117, Retrieved from the Internet: URL:http://citeseer.ist.psu.edu/bilenko03adaptive.html [retrieved on Apr. 4, 2008], Aug. 2003, 10 pages.
China Patent Office, "Application Serial No. CN200880124775.2, English and Chinese Translations, First Office Action dated Jul. 13, 2011", 19 pages.
China Patent Office, "Chinese Application No. 200880124775.2, Second Office Action dated Aug. 3, 2012", English translation and Chinese Translations, 13 pages.
China Patent Office, "Application Serial No. CN200880124775.2, English and ahinese Translations, Third Office Action dated Apr. 2, 2013", 7 pages.
China Patent Office, "Chinese Application Serial No. 200880124775.2, Fourth Office Action dated Feb. 8, 2014", English and Chinese Translations, 17 pages.
China Patent Office, "Chinese Application No. 200880124775.2, Fifth Office Action dated Sep. 25, 2014", Chinese and English translations, 7 pages.
China Patent Office, "Chinese Application No. 201180013496.0, First Office Action dated Dec. 3, 2014", English and Chinese Translations, 19 Pages.
CIPO, "Application Serial No. 2,742,395, 1st Office Action dated Feb. 18, 2015", 4 pages.
CIPO, "CA Application No. 2,742,395 Office Action dated Nov. 10, 2015", 3 pages.
Elmagarmid, AK. et al., "Duplicate Record Detection: ASurvey", IEEE Transactions on Knowledge and Data Engineering, IEEE Service Center, Los Alamitos, CA, US, XP011151234, ISSN: 1041-4347 vo 1. 18, No. 1, Jan. 1, 2007, pp. 1-16.
EPO, "EP Application Serial No. 08850236.4, European Office Action dated Nov. 4, 2014", 6 pages.
EPO, "EP Application Serial No. 08850236.4, European Search Report dated May 21, 2012", 7 pages.
EPO, "EP Application Serial No. 11732308.9, European Search Report dated Oct. 11, 2013", 3 pages.
Garcia, SM. et al., "Imnunization 1-15 Registries DeDuplication and Record Matching", Internet Citation—Retrieved from the Internet: URL:www.imnunizationregistries.comjwhite papersj—WHP006A deduplication recordmatching.pdf [retrieved on Oct. 27, 2003], 1999, 12 pages.
Mooney M, R J. et al., "Adaptive duplicate detection using learnable string similarity measure", Internet Citation, Aug. 2003 (Aug. 2003), XP002475117. Retrieved from the Internet: URL:http://citeseer.ist.psu.edu/bilenko03a daptive.html [retrieved on Apr. 4, 2008], Aug. 2003, 10 pages.
"The Four Challenges of Customer-Centric Data Warehousing", Internet Citation—XP002259648, Retrieved from the Internet: URL:http://www.ctiforum.com/technology/CRM jwhitepaperjdwo.pdf [retrieved on Oct. 27, 2003], Nov. 1998, 16 pages.
USPTO, "U.S. Appl. No. 12/271,593, Non-Final Office Action dated Oct. 14, 2010", 7 pages.
USPTO, "U.S. Appl. No. 12/271,593, Final Office Action dated May 16, 2011", 11 pages.
USPTO, "U.S. Appl. No. 12/271,593, Notice of Allowance dated May 11, 2012", 8 pages.
USPTO, "U.S. Appl. No. 12/271,593, Notice of Allowance dated May 1, 2013", 20 pages.
USPTO, "U.S. Appl. No. 13/004,368, Non-Final Office Action dated Apr. 27, 2012", 12 pages.

(56) References Cited

OTHER PUBLICATIONS

USPTO, "U.S. Appl. No. 13/004,368, Notice of Allowance dated Jan. 8, 2013", 15 pages.
USPTO, "U.S. Appl. No. 13/343,354. Notice of Publication", dated Aug. 9, 2012, 1 page.
USPTO, "U.S. Appl. No. 13/343,354, Non-Final Office Action dated Mar. 15, 2013", 14 pages.
USPTO, "U.S. Appl. No. 13/343,354, Notice of Allowance dated Sep. 6, 2013", 19 pages.
USPTO, "U.S. Appl. No. 13/790,049, Non-Final Office Action dated Sep. 12, 2014", 18 pages.
USPTO, "U.S. Appl. No. 13/790,049, Non-Final Office Action dated Jan. 23, 2015", 13 pages.
USPTO, "U.S. Appl. No. 13/790,049, Final Office Action dated Jul. 10, 2015", 15 pages.
USPTO, "U.S. Appl. No. 13/906,007, Non-Final Office Action dated Oct. 20, 2014", 7 pages.
USPTO, "U.S. Appl. No. 13/906,007, Final Office Action dated Mar. 27, 2015", 12 pages.
USPTO, "U.S. Appl. No. 14/096,662, Non-Final Office Action dated Feb. 13, 2015", 20 pages.
USPTO, "U.S. Appl. No. 14/096,662, Final Office Action dated Oct. 1, 2015", 22 pages.
USPTO, "U.S. Appl. No. 14/097,474, Non-Final Office Action dated Feb. 2, 2015", 23 pages.
USPTO, "U.S. Appl. No. 14/097,474, Final Office Action dated Sep. 15, 2015", 12 pages.
USPTO, "U.S. Appl. No. 14/205,058, Non-Final Office Action dated Jan. 28, 2015", 17 pages.
USPTO, "U.S. Appl. No. 14/488,401, Non-Final Office Action dated Jan. 15, 2015", 17 pages.
USPTO, "U.S. Appl. No. 14/488,401, Final Office Action dated Jun. 18, 2015", 17 pages.
WIPO, "International Application Serial No. PCT/US2008/083623, Search Report and Written Opinion dated Apr. 16, 2009", 12 pages.
WIPO, "International Application Serial No. PCT/US2011/20807, Search Report and Written Opinion dated Apr. 20, 2011", 10 pages.

* cited by examiner

200

- 205 Generating a target object index based on a group of target objects
- 210 Performing a cleaning operation on the at least one related value of each target object
- 215 Performing a cleaning operation on one or more data values of each source object of a group of source objects
- 220 Performing, for each source object in a group of source objects, one or more lookup operations on each target object in the target object index
- 225 Generating a plurality of source target object pairs, each source target object pair comprising one source object and one target object having at least one matching data value
- 230 Converting each source target object pair into a numeric feature vector
- 235 Classifying the numeric feature vector corresponding to each source target object pair using a binary classifier
- 240 Applying a match score to each source target object pair based on the classification using the binary classifiers
- 245 Discarding any source target object pair having a match score lower than a match threshold value

```
┌─────────────────────────────────────────────────────────────────────┐
│ 245  Discarding any source target object pair having a match score  │
│ lower than a match threshold value                                  │
└─────────────────────────────────────────────────────────────────────┘
                                    │
                                    ▼
┌─────────────────────────────────────────────────────────────────────┐
│ 305  Ranking the source target object pairs having a match score    │
│ higher than the match threshold value based on match scores         │
└─────────────────────────────────────────────────────────────────────┘
                                    │
                                    ▼
┌─────────────────────────────────────────────────────────────────────┐
│ 310  Selecting a subset of the ranked source target object pairs    │
│ based on a likelihood that the source object and the target object  │
│ of each source target object pair of the subset are associated      │
│ with the same object                                                │
└─────────────────────────────────────────────────────────────────────┘
                                    │
                                    ▼
┌─────────────────────────────────────────────────────────────────────┐
│ 315  Creating a persistent entry for each source target object pair │
│ of the subset, each persistent entry indicating the likelihood that │
│ the source object and the target object are associated with the    │
│ same object                                                         │
└─────────────────────────────────────────────────────────────────────┘
```

245 Discarding source target object pair having a match score lower than a match threshold value 405 Populating a disjoint set data structure with a plurality of entity objects 410 Ingesting source target object pairs having a match score higher than the match threshold value 415 Updating the disjoint set data structure using a union-find algorithm on each source target object pair having a match score higher than the match threshold value 420 Generating an edge weighting value for each source target object pair having a match score higher than the match threshold value based on the match score applied to the source target object pair 425 Determining a set of candidate cuts based on the edge weighting values, each candidate cut relating to one or more edges linking elements of the disjoint set data structure 430 Scoring each candidate cut based on an expected error rate of the binary classifier 435 Performing one of the candidate cuts based on a score assigned by the binary classifier being above a cut threshold value 440 Creating a plurality of sub-clusters, each sub-cluster comprising a subset of elements of the disjoint set data structure 445 Recursively repeating the determining, scoring, and performing steps for each sub-cluster of the plurality of sub-clusters 450 Defining a new entity object for each sub-cluster based on a score assigned by the binary classifier being below the cut threshold value

FIG. 4

MTRANSACTION PROCESSING IMPROVEMENTS

CROSS REFERENCE TO RELATED APPLICATIONS

This application claims priority to U.S. provisional application No. 62/594,480, filed Dec. 4, 2017 and U.S. provisional application No. 62/596,898, filed Dec. 10, 2017, both of which are thereby incorporated by reference herein in their entireties.

TECHNICAL FIELD

This application relates generally to systems and methods for resolving a relationship between objects. In particular, this application relates to systems and methods for improved entity resolution, entity identifier persistence, and semantic search techniques.

BACKGROUND

The global supply chain encompasses massive economic activity, but is opaque and inefficient. Data and machine intelligence are the solution, but raw supply chain data is complex, unstructured, siloed, and hard to access. For example, commerce transaction records, such as customs records of transactions may be captured in a plurality of languages, such as an origination country language (e.g., Chinese), an intermediate country language (e.g., French), a destination country language (e.g., English) and the like. Information in such transaction records may vary widely, based on regional preferences, laws, trade guidelines, and the like; however each is capturing information about a common transaction record. Determining information from such records, such as country, product, buyers, suppliers, addresses and the like often requires complex and processor-intensive operations, which in many cases, are still incapable of resolving useful information such as when two records relate to the same entity.

SUMMARY

In one aspect, the technology features a computer-implemented method for resolving a relationship between objects. A target object index is generated based on a group of target objects. One or more lookup operations is performed on each target object in the target object index for each source object in a group of source objects. A plurality of source target object pairs is generated, each source target object pair comprising one source object and one target object having at least one matching data value. Each source target object pair is converted into a numeric feature vector. The numeric feature vector is classified corresponding to each source target object pair using a binary classifier. A match score to each source target object pair is applied based on the classification using the binary classifier. Any source target object pair having a match score lower than a match threshold value is discarded.

In one aspect, the technology features a system for resolving a relationship between objects, the system comprising one or more processors and memory, the memory including computer-readable instructions operable to cause the one or more processors to generate a target object index based on a group of target objects. The memory includes computer-readable instructions operable to cause the one or more processors to perform, for each source object in a group of source objects, one or more lookup operations on each target object in the target object index. The memory includes computer-readable instructions operable to cause the one or more processors to generate a plurality of source target object pairs, each source target object pair comprising one source object and one target object having at least one matching data value. The memory includes computer-readable instructions operable to cause the one or more processors to convert each source target object pair into a numeric feature vector. The memory includes computer-readable instructions operable to cause the one or more processors to classify the numeric feature vector corresponding to each source target object pair using a binary classifier. The memory includes computer-readable instructions operable to cause the one or more processors to apply a match score to each source target object pair based on the classification using the binary classifier, and discard any source target object pair having a match score lower than a match threshold value.

Any of the above aspects can include one or more of the following features. In some embodiments, the source target object pairs having a match score higher than the match threshold value based on match scores are ranked. In some embodiments, a subset of the ranked source target object pairs is selected based on a likelihood that the source object and the target object of each source target object pair of the subset are associated with the same object. In some embodiments, a persistent entry is created for each source target object pair of the subset, each persistent entry indicating the likelihood that the source object and the target object are associated with the same object.

In some embodiments, a disjoint set data structure is populated with a plurality of entity objects. In some embodiments, source target object pairs having a match score higher than the match threshold value are ingested. In some embodiments, the disjoint set data structure is updated using a union-find algorithm on each source target object pair having a match score higher than the match threshold value.

In some embodiments, an edge weighting value is generated for each source target object pair having a match score higher than the match threshold value based on the match score applied to the source target object pair. In some embodiments, a set of candidate cuts is determined based on the edge weighting values, where each candidate cut relating to one or more edges linking elements of the disjoint set data structure. In some embodiments, each candidate cut is scored based on an expected error rate of the binary classifier. In some embodiments, one of the candidate cuts is performed based on a score assigned by the binary classifier being above a cut threshold value.

In some embodiments, performing one of the candidate cuts further includes creating a plurality of sub-clusters, each sub-cluster comprising a subset of elements of the disjoint set data structure.

In some embodiments, the determining, scoring, and performing steps for each sub-cluster of the plurality of sub-clusters are repeated recursively. In some embodiments, a new entity object is defined for each sub-cluster based on a score assigned by the binary classifier being below the cut threshold value.

In some embodiments, a plurality of server computing devices perform the recursively repeating step for the plurality of sub-clusters, each sub-cluster of the plurality of sub-clusters being operated on by a different server computing device substantially in parallel. In some embodiments, determining a set of candidate cuts further includes applying a candidate partition algorithm to the disjoint set data structure. In some embodiments, the candidate partition algorithm is at least one of Karger's algorithm, the Karger-Stein algorithm, and a spectral clustering algorithm.

In some embodiments, each target object in the group of target objects includes a target object identifier, and at least one related value. In some embodiments, each target object further includes a target object partition key. In some embodiments, the at least one related value matches a value of at least one other target object in the group of target objects.

In some embodiments, a cleaning operation is performed on the at least one related value of each target object. In some embodiments, performing the cleaning operation further includes one or more of normalizing the case of text, normalizing punctuation of text, and expanding abbreviations of text. In some embodiments, the cleaning operation is performed prior to generating the index. In some embodiments, a separate index is generated for each value of the partition key.

In some embodiments, each source object in the group of source objects comprises a source object identifier. In some embodiments, each source object in the group of source objects further comprises a source object partition key. In some embodiments, the binary classifier includes a pre-trained machine learning model based on one or more of a random forest method, logistic regression, a support vector machine, and a neural network. In some embodiments, a cleaning operation is performed on one or more data values of each source object of a group of source objects.

BRIEF DESCRIPTION OF THE DRAWINGS

The advantages of the systems and methods described herein, together with further advantages, may be better understood by referring to the following description taken in conjunction with the accompanying drawings. The drawings are not necessarily to scale, emphasis instead generally being placed upon illustrating the principles of the described embodiments by way of example only.

FIG. 2 is a flow diagram of a method for resolving a relationship between objects, according to embodiments of the technology described herein.

FIG. 3 is a flow diagram of a method for resolving a relationship between objects incorporating match ranking and conflict resolution, according to embodiments of the technology described herein.

FIG. 4 is a flow diagram of a method for resolving a relationship between objects incorporating clustering operations, according to embodiments of the technology described herein.

DETAILED DESCRIPTION

Figure 1A:
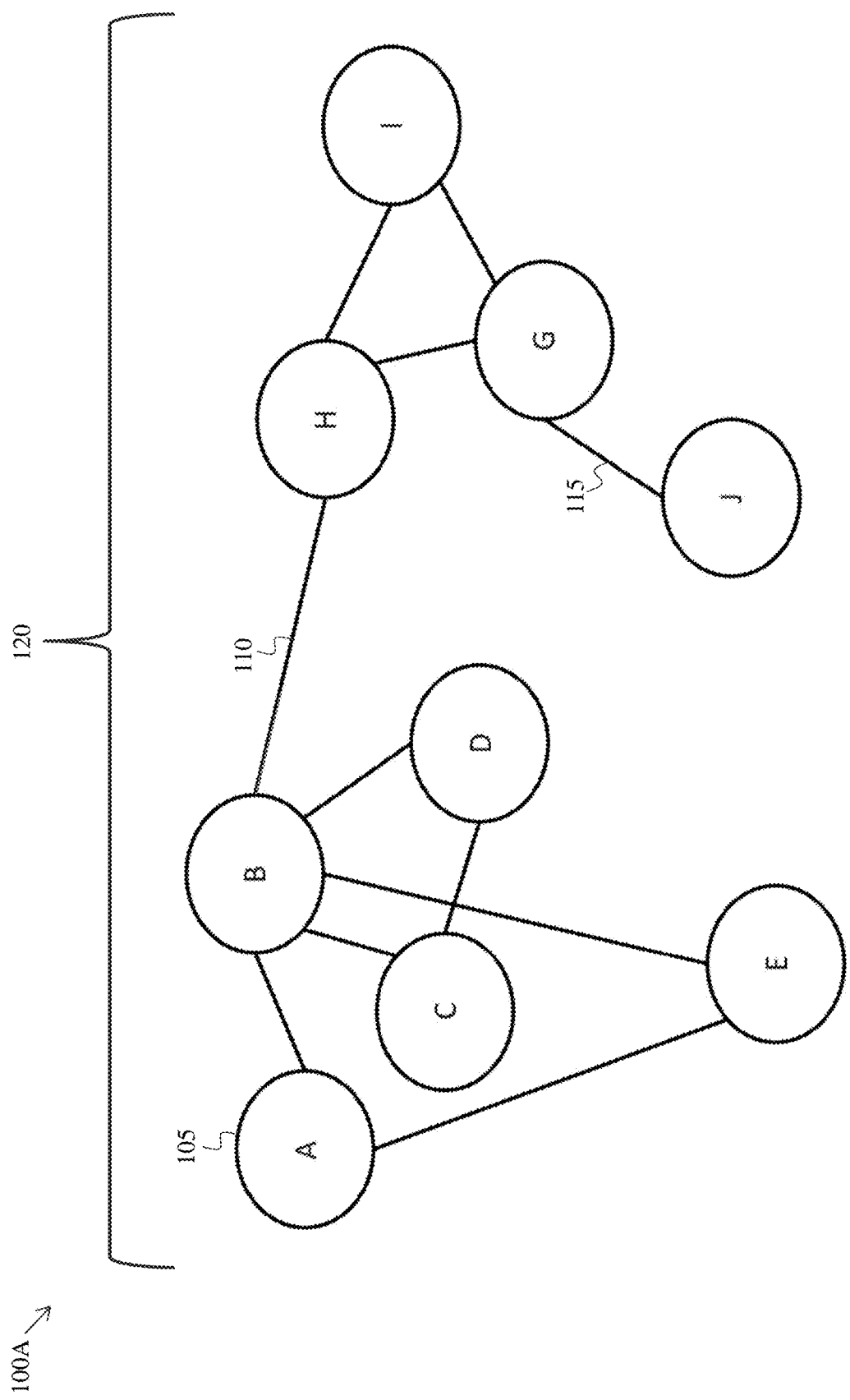
FIG. 1A shows a graphical schematic of the logical link relationships for an exemplary member set, according to embodiments of the technology described herein.

In embodiments, commerce transaction records, such as customs records of transactions may be captured in a plurality of languages, such as an origination country language (e.g., Chinese), an intermediate country language (e.g., French), a destination country language (e.g., English) and the like. Information in such transaction records may vary widely, based on regional preferences, laws, trade guidelines, and the like; however each is capturing information about a common transaction record. Determining information from such records, such as country, product, buyers, suppliers, addresses and the like often requires processing data in free-form data fields of such records. Therefore, a system that can process transaction records and extract data from free-form data fields across a plurality of records may facilitate improving country classification and the like of such records for platforms that process and utilize this information at the transaction-level and higher levels of aggregation and abstraction.

In embodiments, methods and systems for country classification and the like may facilitate classifying transaction records into categories, such as HS codes for products, addresses for association with certain countries and the like. Developing an understanding of country-specific aspects of transaction records, such as the preferences, typical and customary uses and the like, for example when recording addresses may benefit aggregation and the like of transaction records across languages, and to a great extend independent of completeness of the information.

In embodiments, techniques for these methods and systems may include deep learning based on principles such as word vectors, semantic hashing, synthetic machine learning training sets and the like. In embodiments, word vectors, semantic hashing and the like may facilitate determining when terms that appear in transaction records indicate a degree of similarity and when those same terms do not. In an example, automobile manufacturer names can be close semantically within a group that they represent. Specifically an example includes Ford and Chevrolet. These two names may represent a group of U.S. automobile manufacturers, and therefore would suggest some degree of similarity in transaction records that include these terms. This similarity may be exploited when processing transaction records, such as when analyzing free-form data in such transaction records. An example of exploiting this similarity may include biasing certain algorithms that look for addresses. Therefore, rather than considering a semantically close use of Ford to perhaps include any entity with the name Ford, processing of the transaction records for address data may be biased to first attempt to match candidate address data in the transaction records to known addresses-related data for Ford Motor Company, and the like. In other examples, certain products (e.g., HS codes) may be designated in volume (e.g. liquids and the like), and others in weight (raw steel rods, e.g., KG, metric tons and the like). By semantically hashing data in transaction records certain assumptions may be validated and/or increased in confidence, thereby reducing an amount of processing (e.g., reduced memory requirements, reduced number of processors, reduced amount of network-traffic, and the like) that may be required to process the transaction records, and the like.

In embodiments, glossaries and the like that may include word-meaning correspondence may be used to further improve the likelihood/confidence that data in a transaction record (such as data indicative of an address in a free-form field) represents a specific type of data, such as an address and the like. Cross-language glossaries may be developed based on the information in transaction records and country-specific record entry learning. These cross-language glossaries may further enhance classification of information in transaction records, including data such as messy, incomplete, misplaced, and the like.

In embodiments, classification may benefit from machine learning across a plurality of records with a range of messiness, particularly when the expected learning from the records is known. Therefore, for this and other reasons, synthetic training sets may be generated. A synthetic training set may include known good records that have been processed with an algorithm that inserts defects into the data in the records based on information derived from records with known defects that, for example may not have an underlying detectable structure to generate a range of defective records. Known defective records may be analyzed to determine frequency, type, and the like of defects, such as missing characters, missing words, swapped order of items (words, address/entity name, and the like), extra characters/words, duplication of data, abbreviation of data, missing spaces causing two words to be concatenated, initial and terminating truncation of data items, and the like. A measure of these and other defects may be made to determine frequency, type, combinations, and the like that may occur in real-world defective records. These measures may be language-specific, country specific, customs office specific, and the like. These measures may be described as probabilities of defect detection and may be used as an input to process known good transaction records to generate a defective set of records that may be used as a training set for machine learning.

In embodiments, a single known good record may be processed with the defective record measures above to produce a plurality of synthetic training records that may include a range of defects and combinations thereof. One non-limiting example of such an approach may be known in the art as "noising"; however, the methods and systems described herein may be implemented to facilitate cross-language "noising" so that records in a first language (e.g., English) may be translated into a second language and then caused to be "noised" in the second language by the methods and systems for synthetic training set generation as described above and elsewhere herein.

In embodiments, synthetic training sets may be useful for address-related machine learning. In an example, noising a known good record that includes valid country, port, and address data with address defects may benefit machine learning of a valid address based on, for example a known good country, port and the like, such as when combined with a plurality of records for similar transactions that have been processed through the known good port and/or country. Certain addresses or portions of addresses, such as a U.S. state may be known to be more likely to be associated with transactions being processed through a certain U.S. port. Therefore, when a transaction is processed through the known port, its likely range of valid addresses is reduced.

In embodiments address cleaning and structuring via recurrent neural nets and the like may include applying an unsupervised machine learning approach to records that may be known to be defective (e.g., messy or "noised" as described above). Such a machine learning approach may be applied character by character to develop an understanding, with in a set of records, of character ordering that may facilitate predicting which next character is likely to occur. A result of such unsupervised learning may be an understanding of the types, frequency, relevance, order and the like of defects in the set of records. This understanding of characterizing defective records may benefit generating synthetic training sets described above at least by providing an understanding of the patterns and the like in the data that is driven by the data absent any expectation of outcome (without referencing any known good data and the like). In embodiments, such unsupervised learning may yield an understanding of commonly occurring defects, such as common misspelling of words (e.g., Peking instead of Beijing) and the like by learning that, for example both spellings are used in comparable ways in a plurality of records, and the like.

In embodiments, other techniques, such as those employed for cross-language translation (e.g., word-by-word processing) may be applied to defective transaction record data, such as if the defective data was a form of a first language and the target cleansed data is the target language version of the first language word. Common misspellings, such as Peking and Bejing may be learned as described above than then language translation algorithms may be applied to efficiently cleanse defective data by replacing known first-language (defective) words with known proper second-language (cleansed) words. In embodiments, cross-language translation techniques, such as the use of translation memories, dictionaries, and the like may also be utilized to cleanse defective transaction record data.

In embodiments, a plurality of transaction records captured, for example, in a plurality of countries for substantially the same shipment may be facilitate matching shipment records. In embodiments, a single shipment may be recorded as a plurality of transactions, typically including at least one source/export transaction record and at least one destination/import transaction record. When such records may be determined to be for the same shipment (e.g., based on container identifier and the like), data in each of these transaction records may be collected and/or recorded into a common shipment record that may further facilitate determining proper information about the shipment, such as countries (both may appear on an export and an import record for the common shipment). In embodiments, an understanding or determination that two transaction records are for a common shipment may facilitate reducing processing load, memory requirements, network loading (e.g., on distributed computing applications) when processing the records at least because certain aspects of the transaction records will be limited. As an example, if an export and import record is for a common product, a partial address of a shipper in a first record may be offset by a more complete address of the shipper in the second record. This simplified example is not intended to be limiting and many other techniques related to similarity of data may be applied. Further in embodiments, two transaction records for a common shipment (e.g., based at least in part on a container identifier) may have certain terms recorded in a first language and corresponding terms recorded in a second language, even if the records may appear to have no comparable data, and certainly almost no matching data. A range of information in transaction records may be used to determine if they are likely to be for the same shipment (e.g., an export and an import record). Non-limiting examples include bill of entry numbers, IEC numbers, shipment bill date, consignee, shipper, contents, weight, liability transfer point, GLN numbers, UPC prefixes, and the like.

In embodiments, combining transaction records (e.g., import and export) for a common shipment may reduce a total count of transaction records to process for entity resolution and the like by a factor of two, this reduced transaction count directly reduces memory requirements, processing load (e.g., fewer processors), network activity and the like while improving computer performance (fewer records to process results in an improvement of the performance of a computer to, for example resolve an entity of transactions), and the like. Other improvements related to this technique of effectively pruning the size of data sets to be processed may include faster operation of computer functions, such as searches and the like.

In embodiments, fingerprinting of transaction records, may facilitate detection of a source of transaction records, such as a computer system for producing transaction records. Patterns of data within records, such as common occurrence of a plurality of data types in records may indicate the records were created with a common transaction record generation system. Examples of data on which fingerprinting may be determined may include without limitation, an order of occurrence of information in records, boiler plate language in records, and the like. Fingerprinting may also facilitate predicting expected data in records based on presence of certain other types of data in a record. This expectation may facilitate determining if a record has been generated from a particular system, even if the actual system is not known, based on a characterization of the system due to the fingerprinting of records. In an example, all records with highly compatible fingerprints are likely to be generated by a particular record generation system or method. Therefore, one or more fingerprints may be grouped and treated as, for example, a characterization of a particular transaction record producing system. Such knowledge may benefit other aspects of the methods and systems herein at least because it presents an additional measure of the potential for similarity of records and therefore, may facilitate cleansing, classifying, aggregating, entity resolution and the like for such records. In embodiments, fingerprinting may also be applied to parsing.

In embodiments, when determining if two different company names in two different records represent a likely common entity identifier, shipment information of the two different companies with other companies (e.g., other entity identifiers than the one likely common entity identifier) may be helpful. In an example, when company A1 and company A2 may potentially represent a common entity identifier A, trading partner information in the transaction records with company A1 and A2 may be considered. Further in this example, company A1 and company A2 may conduct transactions with company B. This common trading partner, along with other information, such as which products are being shipped, shipping trends, common misspellings, other descriptive or logistics information and the like may further improve a likelihood that A1 and A2 are different manifestations in the records of common entity identifier A. In embodiments, when shipments represent transactions between similar entities, such as between A1 and B1 and A2 and B2, then the likelihood that A1 and A2 resolve to the same entity and B1 and B2 resolve to the same entity are higher. Similar arrangements of transactions also may enforce a likelihood that two companies such as A1 and A2 represent the same common entity identifier, such as A1 transacts with B2 and A2 transacts with B1, and the like.

In embodiments, methods and systems for determining a comprehensive list of items, such as shipping ports in context of customs transaction record analysis and the like described herein may be performed with substantially less computing time by applying entity resolution techniques described herein. By determining if information in transaction records indicate that two identically named ports are not the same port, such as by one port being located in a first country and another port of the same name being located in a second country, a definitive list of ports may be generated. When such a list is generated, it may be used to quickly and effectively resolve defects and/or lack of clarity in transaction records associated with shipment port information in the records. This technique may be applied generally to any list of items, such as cities in a state, county, country, and the like. Techniques that may be applied include machine learning of ports, entity resolution methods described herein, and the like.

In embodiments, performing entity resolution, such as determining a common entity identifier for any given shipment, may involve determining not only a current corporate hierarchy, but a past corporate hierarchy as well. A company represented by a common entity identifier may become part of a corporate structure through an acquisition, and the like. A point in time when this change occurs and/or is effective may indicate a change in common entity identifier, or at least a corporate owner of a shipment described in a transaction record. By applying corporate structure change logs, such as those that may be available to the public and the like may effectively facilitate determining when changes in shipment ownership occur. A time-specific corporate hierarchy may be created and applied to entity resolution for determining companies in transaction records. Use of trade data and the like may be enhanced by developing an understanding of which shipments belong to which entity in a corporate hierarchy and when changes to the hierarchy result in shipments belonging to other entities in a corporate hierarchy. In embodiments, by applying filters with different levels of granularity, shipment records may be shown to be owned by different entities in a corporate hierarchy, such as based on application need. As an example, if company B is owned by company A, then shipments can be shown to belong to company A even though company B appears in a shipment record and the like.

An application of the methods and systems of developing an understanding of corporate entity structure changes beyond real-world corporate structure changes provides improvements in entity resolution. In embodiments, determining that two sets of entity references that previously mapped to separate common entities should now map to the same common entity. This facilitates decoupling the entity resolution processing from the user experience, so that the entity resolution algorithm may be updated while maintaining a consistent view of the data. This may facilitate detecting proper differences between common entities "Edmonds-Karp" and "Edmonds-Carp". In embodiments max-flow algorithms may be adapted to handle preferences/ match scores. In embodiments a customized initialization routine for the max-flow algorithm that does a greedy maximization of preferences may be used, followed by tracking score changes over iterations of the max-flow algorithm and stopping it early if score begins to decrease. An additional algorithm that may be employed, which does not use max-flow is alternate greedy preference maximization, alternating between old entities and new until a stable solution is obtained. This is an adaptation of algorithms used to resolve a stable-marriage problem, but with preferences.

In embodiments, the methods of entity resolution described herein and elsewhere may be substantially sped up using a streaming approach that can benefit from parallel processing and the like. By using a streaming approach, where a first step in an entity resolution process for a pair of records, for example, is processed by a first computer and a second entity resolution step is performed by a second computer, potentially in parallel with the first entity resolution step being performed on a second pair of records by the first computer, and further steps are performed by other computers, processing, memory, and network load is substantially reduced, thereby improving effective performance of computers being utilized for entity resolution.

Streaming or pipelining in this way may reduce memory footprint because fewer records are required to be available to each computer at one time. In addition, each entity resolution step may be run on a plurality of computers in parallel so that each pipeline may be executed independently of others. Another advantage of this streaming approach to entity resolution and the like is that transaction records may be processed in any order, thereby allowing updating of output data sets asynchronously with ingestion of new data.

In embodiments, methods of shipment valuation and or weight estimation may go beyond HS code and trade lane assessment by the addition of performing machine learning on description data to try to estimate a tier or the like of a shipment to facilitate scaling conversion within expected range. This may be performed when, for example some data sets include shipment values, some include shipment weights, some include both, and some include descriptions so learning from the descriptions may be performed, such as if it is possible to match up shipments across data sets to fill in missing data and the like. In embodiments machine learning and the like applied here may facilitate detecting indicators of upmarket/downmarket or the like.

In embodiments, the methods and systems for processing trade data and other related data that may facilitate entity resolution and the like may be applied to generate thematic equity indexes based on the shipment data in the transaction records and the like. A thematic equity indexes may include potential identified index members (e.g. stock tickers). These indexes may reweight automatically based on exposure vs. total trade activity.

In embodiments, use of accelerating shipment data (e.g., trends) and the like matched to a list of private companies, that may be joined to existing fund raisings via company identifiers may facilitate identifying companies that may require additional funding or may be approaching IPO or approaching some sort of exit, including bankruptcy and the like when the acceleration trend is substantially negative.

In embodiments, a visualization of a corporate hierarchy may be annotated with trade data that may include shipment analytics, thereby potentially showing the relationships between constituent companies, and how those relationships change over time. This may be accomplished by grouping shipments by multiple keys (e.g., using pivot tables and the like) to create such a visualization. Visualizations may include heat maps (e.g., map color tied to volume, and the like) that may facilitate detection of test shipments, and the like.

In some embodiments, Sku's and pricing lookups are used to identify certain product categories (apparel, furnishings, etc.) where market tier is important. For example, applying machine learning techniques to information about customer type in conjunction with description may facilitate identifying key product categories for certain customer types. In some embodiments, global search ordering based on one or more of value, weight, number of shipments, and influence equivalences. In some embodiments, the methods and systems utilize house, master cross comparison, and/or expansion values. In some embodiments, the methods and systems utilize one or more of commodity cleaning including line ending, PDF parsing, max-flow algorithm for id persistence, anomaly detection, shipment time series, and network.

In some embodiments, Lead scoring and/or targeting are utilized. For example, leads are scored, either in shipping data or otherwise, using machine learning. Objects are ranked to their expected value or likelihood of being a sale. In one example, for a request for a demo, the requester can be scored for its likelihood of being a sale, being a $1M lifetime sales, etc. Accordingly, the shipment history of a demo request can be used to help score the lead.

In particular, a large set of possible features of similarity to the desired features is made. Essentially training sets are generated for machine learning to determine what characterizes what the user wants. Applying entity resolution output to the machine learning and scoring techniques highly increases performance. This technique could be used for any arbitrary purpose, including financial investment.

An example procedure to resolve a relationship set among a group of objects is described following. A relationship set includes a number of related values corresponding to the group of objects, in either a many-to-one relationship (e.g., each related value corresponds to one or more of the group of objects) or in a many-to-many relationship (e.g., each related value corresponds to one or more of the group of objects, and each of the group of objects relates to one or more of the related values). For example, the group of objects may be a set of transactions, shipping records, abstracted shipping records (e.g., pseudo records created from shipping records, for example to divide a shipping record up into logical portions, etc.), etc. Further, the related values may be entities (e.g., shipper, buyer, consigner) or other values related to a record, such as a port, country, city, address, product, product code (e.g., a harmonized standard ("HS") code, an industry standard coding, etc.), etc. In certain embodiments, the related values are company names or company identifiers.

The example procedure includes an operation to create a table, data structure, and/or list of raw values of the related values from the group of objects. The list of raw values will be described as a "related value list" for purposes of clarity of description. The related value list, in certain embodiments, includes a list created from an entire data set of interest—for example including all shipping records of interest for which a relationship set is to be created. An example related value list includes a subset of the data set of interest—for example a data set may be divided into six (6) subsets, each subset processed according to operations described herein, potentially in parallel across a number of computing resources. The number of subsets utilized is selectable, and can be utilized to streamline processing of the group of objects and creation of the relationship set. The determinations to select a number of subsets include the memory available on various available computing devices, the time to process a given subset on a given computing device, the available network infrastructure (including the location of computing devices to be utilized, the bandwidth between those devices, the current level of network activity, etc.), the time desired to begin receiving outputs of the relationship set (e.g., one or more subsets may be higher value, and preliminary results from those subsets may have value even before the entire group of objects is processed), and/or the time availability of data from the group of objects.

The processed relationship set from a given subset of the group of objects can be incorporated into a processed relationship set from another subset of the group of objects, enabling several desirable features for certain embodiments, including at least: parallel processing of subsets without having to consider other subsets until the incorporation operations; processing of new data and incorporating it with previously determined relationship sets without having to re-process the entire group of objects; processing some of the group of objects first and waiting with other ones of the group of objects (e.g., processing members of the group of objects believed to be more relevant to a given inquiry first, holding some of the members of the group of objects until cleaning operations or other pre-processing is complete, etc.); and/or dividing the group of objects into subsets that are sized for rapid processing and/or within memory limits of available computing devices. In certain embodiments, the utilization of subsets allows for divisions of the data into selected sub-divisions—for example processing certain members of the group of objects for a specific country, port, etc. before other members of the group of objects.

An example procedure includes operations to utilize cleaned records (e.g., corrections of errors, missing data, etc.) by any operations described throughout the present disclosure, and/or as described in U.S. patent application Ser. No. 14/488,401 entitled "Transaction Facilitating Marketplace Platform," filed Sep. 17, 2014, now U.S. Pat. No. 9,898,767, and/or in U.S. patent application Ser. No. 15/254,714 entitled "Natural Language Processing for Entity Resolution," filed on Sep. 1, 2016, both of which are incorporated herein by reference in their entireties for all purposes. Accordingly, a "raw value" may be a value from a record as-entered, and/or a value from a record that has had some cleaning or pre-processing applied.

An example procedure includes a relationship comparison operation, which includes a preliminary determination that pairs of the group of objects are related in the dimension of the related values. For example, where the related values are company names, the relationship comparison operation includes a preliminary determination that pairs of the group of objects are directed to a same company name. An example procedure includes an outer loop operation to check each of the related values for the relationship value list to each other one of the related values of the relationship value list to determine if the related values are likely to be directed to the same entity, port, consigner, shipper, etc.

A further example procedure includes an inner loop operation to prune the relationship value list before performing the outer loop operation for each one of the related values. For example, a relationship comparison operation selects each of the related values from the relationship value list in turn (e.g., where 20 values are in the relationship value list, an example procedure performs operations for 1, 2, 3, etc. from the list in order). It is understood that the relationship value list can be worked through in any order (e.g., starting with candidates likely to have a lot of matches first, starting with candidates likely to have few matches first, starting with "clean" candidates that appear to be fully and properly entered first, etc.). It is also understood that certain members of the relationship value list may not be worked—for example the last member of the list which will have already been compared against all of the other members. In the example, the relationship comparison operation performs the inner loop operation to prune the list before making comparisons for the selected related value. Example and non-limiting pruning operations include eliminating members from consideration that are highly unlikely to be determined to be a match, such as removing members that have a highly distinct string count (e.g., if the selected member has 5 characters, then members that have over 100 characters may be eliminated), that have highly distinct names (e.g., none of the characters match, a percentage of matching characters is below a threshold, etc.). In certain embodiments, other data may be utilized to prune the list in the inner loop operations—for example if a likely entity for the selected member does not operate in a certain country, with a certain product type, with certain shippers or transport types, etc., then other members of the relationship value list may be removed on that basis.

The example relationship comparison operation proceeds with comparing the selected member of the relationship value list with the remaining members of the relationship value list after the pruning operation. In certain embodiments, comparisons are omitted where they have previously been performed (e.g., #17 of the list may not be compared with #1-#16 where those comparisons have already been performed). Example and non-limiting comparison operations include a comparison of differences, and eliminating the relationship if the comparison of differences provides an indication that the values are not a match. For example, two known entities with similar (or the same) names may be eliminated as a match if the selected member and the comparison member can be correlated to the two known entities with a high level of confidence. In a further example, the selected member may be known to be ABCD corporation (e.g., based on address values, product types, or other information) and a comparison member may be known to be ABCE corporation with a high level of confidence. Accordingly, even if other similarity determination operations of the comparison would have generated a predicted match for the selected member and the comparison member, the difference comparison will block the match from being entered.

The example relationship comparison operation proceeds to perform a comparison match based on similarities between the selected member and the comparison member. The similarity comparison includes determining a number of similarity features, and determining if a match should be entered in response to the similarity features. The similarity features, or similarity metrics, include any of a number of features between the members that tend to indicate similarity. In certain embodiments, hundreds of potential similarity features are available, including at least: performing transformations of the text of the selected member and comparison member and comparing the transformed text (transformations can include: removing white space, removing vowels, removing non-alphabetic characters, applying common mis-spellings, removing common mis-spellings, applying common character transpositions, removing common character transpositions, determining which characters of the text are likely to be the "name" or other property of interest, removing characters of the text that are not likely to be the "name" or other property of the text, and/or comparing a mathematical abstraction of the members such as a frequency description, a checksum, a word length description, and/or a grammar complexity value); comparing text similarities of the members (e.g., consecutive strings of text that are unlikely to be random matches, and/or comparisons of the number of matching text values); comparison of other data aspects of the members (e.g., addresses, ports, containers, names of individuals, product types, etc.); and/or comparing text or number sequences from any ones of these (e.g., a numeric string from an address, a common misspelling or unique spelling of a product which may indicate the origin, etc.).

In certain embodiments, the relationship comparison operation includes a machine learning operation, for example to determine which of the available difference operations and/or similarity operations are likely to be effective in creating proper similarity comparisons for the relationship set. In certain embodiments, the relationship comparison operation further includes determining which of the available difference operations and/or similarity operations are likely to be orthogonal—e.g., are likely to create new knowledge of proper similarity comparisons relative to other ones of the available difference operations and/or similarity operations. The determination of orthogonality of available difference operations and/or similarity operations allows a machine learning operation, over time, to create a smaller, more efficient (e.g., lower number of similarity checks, smaller memory usage, and/or reduced number of processor operations) set of the available difference operations and/or similarity operations and still make similarity determinations that have a high confidence value. In certain embodiments, a determination of orthogonality includes determining how close to orthogonal (e.g., completely independent information) or how far from orthogonal two measures are, and removing, reducing the weighting of, and/or adjusting the parameters of a similarity operation (or a difference operation) in response to the similarity/difference operation lacking sufficient orthogonality with another similarity/difference operation. In certain embodiments, multiple similarity/difference operations lacking orthogonality may be kept in the relationship comparison operation—for example to provide for redundancy and confidence analysis, and/or to cover special cases where the similarity/difference operations are significant even if on the whole they provide little independent information.

Additionally or alternatively, the selected ones of the available difference operations and/or similarity operations may be determined based on certain aspects of the selected member and/or the comparison member—for example a first set of available difference operations and/or similarity operations may be utilized where the selected member appears to be a China company, and a second set of available difference operations and/or similarity operations may be utilized where the selected member appears to be a South America company. More generally, any of the operations of the relationship comparison operation may be modified based on certain aspects of the members being checked—for example the pruning operations, clustering operations (described following), and/or cutting operations (described following) may have operational characteristics adjusted according to the certain aspects of the members being checked.

Additionally or alternatively, any aspects that tend to change the best matching features may be utilized, including at least country or region of origin as described preceding, and/or further including ports, first letters of the members, types of products, individual names appearing in the member record, etc. For example, certain regions, ports, etc. may have features that drive differences in the similarity determination, such as corporate naming tendencies for certain countries or regions, certain common mis-spellings or alternate spellings for certain countries, regions, entities, industries, ports, individuals, or product types, etc.

The example relationship comparison operation includes a clustering operation performed on the linked members from the relationship value list. For example, the linked members may resemble a relationship as depicted in FIG. 1A FIG. 1A shows a graphical schematic 100A of the logical link relationships for an exemplary member set 120. Member set 120 includes a plurality of members A-J. (Member A 105 is expressly enumerated for clarity.) It is understood that the member set can include any number of members, including hundreds, thousands, and/or millions of members. It is also understood that the logical linking relationships (e.g. logical link 110 between members B and H, logical link 115 between members G and J) may be stored and/or utilized in any format, such as a table linking relationships, a matrix storing the link relationships, and/or a graphical depiction of the link relationships. The link relationships such as depicted in FIG. 1A can be combined with other link relationships as disjointed data sets, allowing for the accumulation of piecewise determined data, parallel processing, allowing for data updates as new information comes in to the system, allowing for reprocessing and/or reloading of historical data, and other operations as described throughout the present disclosure. Accordingly, the output of a clustering operation includes a link relationship description, whereby at least a preliminary determination of related entities (or other grouping dimensions for relationships) are stored for further operations. Throughout the present disclosure, a set of link relationships may be referenced as linked relationships, linked members, linked entities, clustered members, and/or clustered entities.

The example relationship comparison operation includes a cutting operation performed on the clustered members from the relationship value list (e.g., performed on a linked relationship set such as depicted in FIG. 1A). The cutting operation generally is directed to removing links from the link relationship that are likely to be false positive relationships—for example two members of the relationship value list may generate a probable match based on the similarity determinations, but the cutting operation determines that the link is likely to be a false positive based upon a view of the entire clustered set. In certain embodiments, the cutting operation includes an operation to perform a "cut" operation (e.g., remove one or more of the relating links between members), and to score the remaining clusters after the cutting operation to determine if the cut improves the confidence that the resulting clusters are properly positive relationships over the original cluster. In certain embodiments, resulting clusters after a cutting operation may further be tested to determine if further cuts again improve resulting sub-clusters (e.g., the cutting operation may be recursive until no further improvements are found).

In certain embodiments, every potential cut of the links may be tested and the resulting clusters scored. Additionally or alternatively, random or pseudo-random cuts of the links may be tested—for example utilizing Karger's algorithm or a similar random cutting algorithm, and/or an extension such as the Karger-Stein algorithm. In certain embodiments, the Karger algorithm can include adapting the random sampling strategy in accordance with a scoring function—for example favoring or disfavoring checks according to the score value, while still maintaining a degree of randomness in the checks. In certain embodiments, the cutting operation seeks the minimum cut—or the cut that breaks the fewest links to create the sub-clusters. In certain embodiments, the links may have weights, such as a confidence that the link is a proper positive link, and an algorithm such as Stoer-Wegner may be utilized in determining the cuts.

The example cutting operation further includes an operation to score a cutting operation. In addition to scoring in accordance with Karger, Karger-Stein, Stoer-Wegner, and/or the scoring of any other cutting algorithm performed, an example cutting operation scores a cut according to the equation $Score = p(MN) - K$, where "M" is the number of nodes/members in a first cluster created by the cut, "N" is the number of nodes/members in a second cluster created by the cut, "p" is a confidence descriptor for the given link being cut, and "K" is the number of cuts in the cutting operation being scored. The "p" value may be determined according to the similarity comparisons and difference comparisons utilized to create the links—for example based upon the types of similarity or difference comparisons utilized to create the links, and/or a value of the similarity or difference comparisons utilized to create the links. In a further example, a similarity comparison may have a threshold of five (5)

identical characters to indicate a link, where another comparison having seven (7) identical characters would have a relatively higher confidence link. In certain embodiments, "p" is determined in response to error rates observed in the previous operations to pair-wise link members of the relationship value list. It can be seen that the term "K" may be instead a term such as $\Sigma_1^K Wn$, where "n" is the designated link between 1 and K (e.g., if K=3, then n will have sequential values 1 through 3, such that each link is included in the scoring of the K term), and where W is the weighted confidence value for an individual link to be cut. It can be seen that the example scoring equation will tend to favor cuts that have the following properties: 1) similar numbers of members/nodes on each side, 2) cutting of low confidence links, 3) cutting of low numbers of links, and 4) cuts between groups of links that have high confidence determinations within each resulting sub-cluster. Accordingly, the example scoring equation will find "weak" links that break up relatively large sub-clusters with relatively few cuts. Any other scoring operations, scoring equations, and/or cutting algorithms understood in the art are further contemplated herein In certain embodiments, the cutting operation includes a spectral cutting (or spectral clustering operation), such as Spielman et al., "Graph Sparsification by Effective Resistances," arXiv:0803.0929 [cs.DS], submitted Mar. 6, 2008; Shi et al., "Normalized Cuts and Image Segmentation," IEEE Transactions on Pattern Analysis and Machine Intelligence, Vol. 22, No. 8, August 2000 (used in image processing but applicable to member clusters herein); and/or Kannan et al., "On clusterings: Good, bad and spectral," JACM, Vol. 51, Issue 3, May 2004. In certain embodiments, spectral cutting and/or clustering is performed to create candidate cuts for operation in a Karger-type cutting operation—for example "sparsifying" the network of links and thereby creating a much more rapid candidate determination and overall algorithm run-time. In certain embodiments, spectral cutting and/or clustering is performed to create candidate cuts for a scoring operation, and is performed independently of a Karger-type cutting operation. In certain embodiments, spectral clustering performs partitioning based on the Fiedler vector. In certain embodiments, spectral clustering utilizes dissimilarity via negative-weight edges (e.g., reference Knyazev, "On spectral partitioning of signed graphs," MERL, 2018. In certain embodiments, Karger-type cutting operations, spectral clustering operations, and/or any other clustering algorithm includes statistical modeling of pairwise edge-scoring errors, including potentially incorporation of interaction terms between edges. Additionally or alternatively, any clustering or cutting operations herein may include vertex-weighting, such as weighting vertices (e.g., nodes or members) close to the cutting division more heavily than vertices far removed from the cutting division.

Figure 1B:
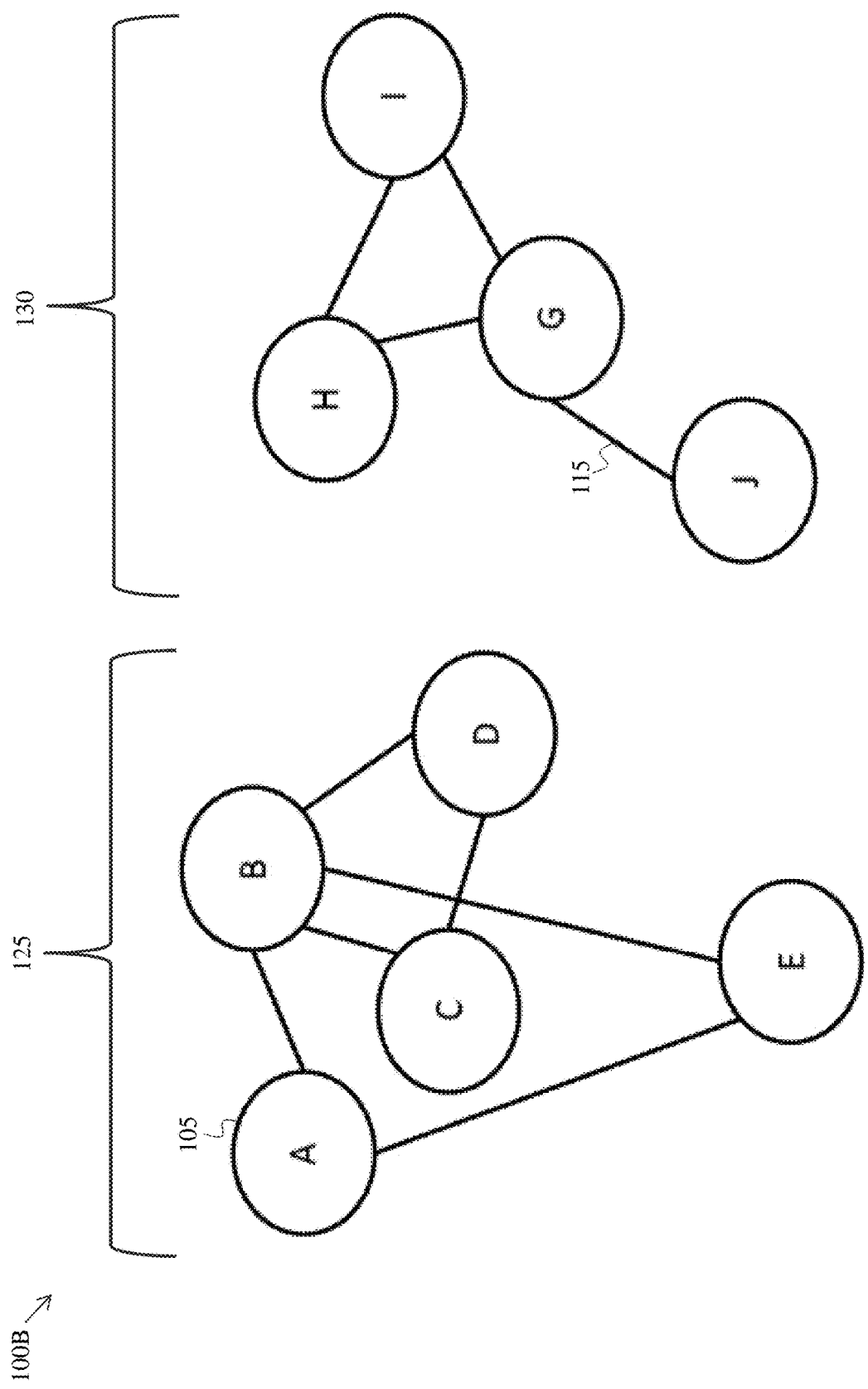
FIG. 1B shows a graphical schematic in which two relationship sub-clusters have been formed, according to embodiments of the technology described herein.

Based on the exemplary graphical schematic of FIG. 1A, an example sub-cluster set that may be an output of the cutting operation, as depicted in FIG. 1B:

FIG. 1B shows a graphical schematic 100B in which two relationship sub-clusters (or clusters, if the output of the relationship comparison operation determines that the sub-clusters depicted in FIG. 1B are the finalized version for the current relationship comparison operations) are formed—sub-cluster 125 comprising members ABCDE and sub-cluster 130 comprising members GHIJ. Logical link 110 between members H and D was removed during the cutting operation, for example based upon a scoring equation or similar operation.

Figure 1C:
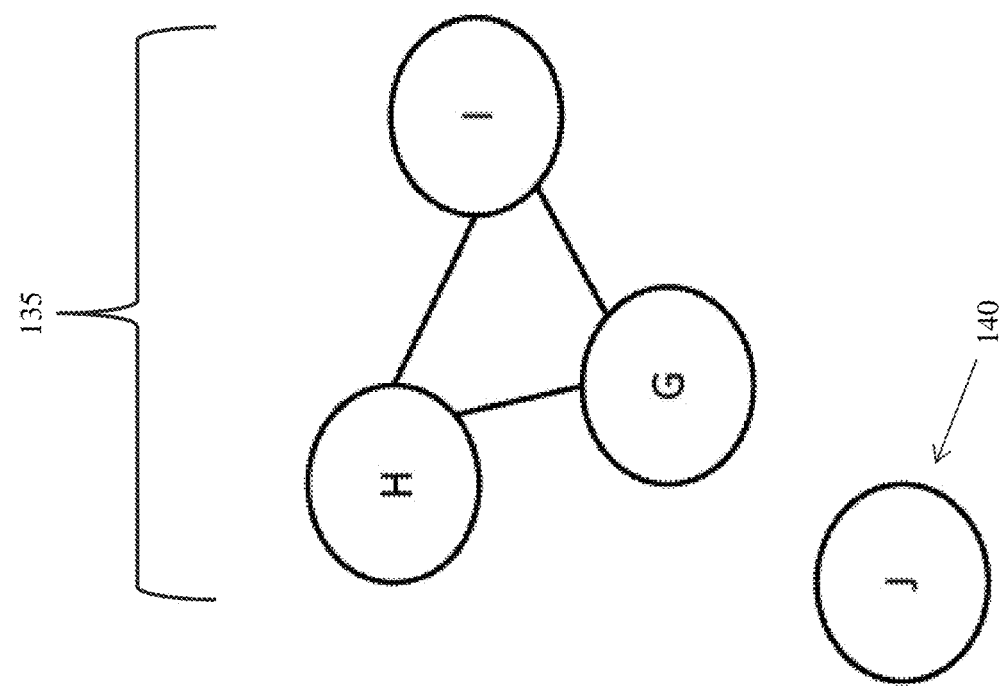
FIG. 1C shows a graphical schematic including three relationship sub-clusters, according to embodiments of the technology described herein.
Figure 1C:
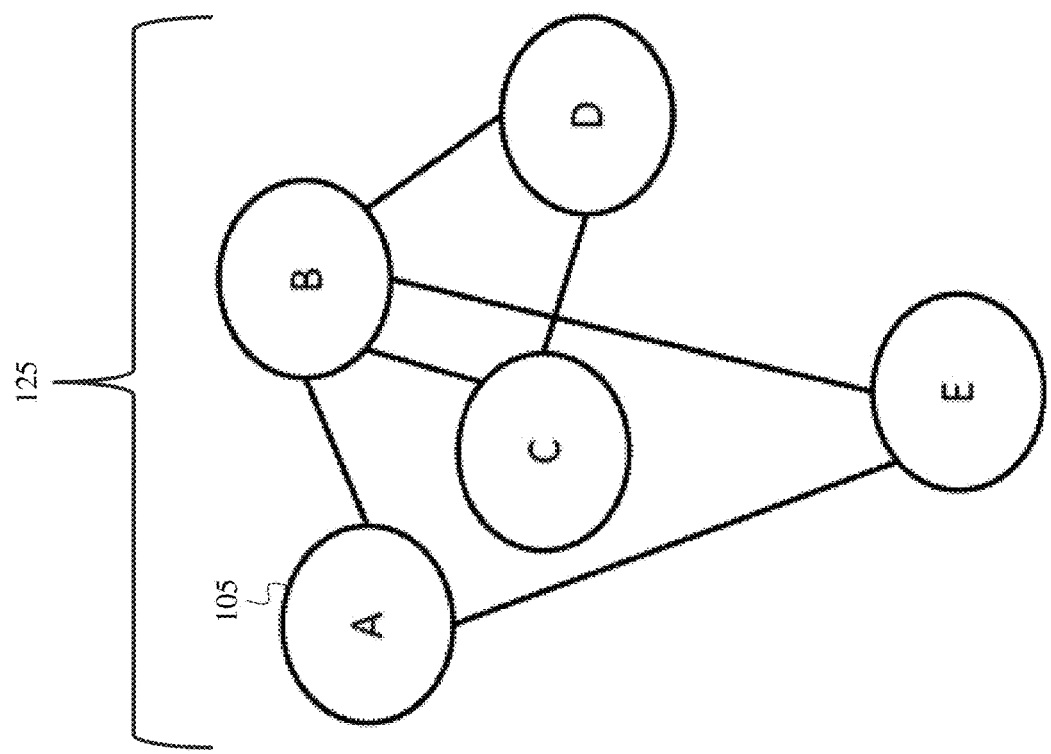

Referencing FIG. 1C, an example sub-cluster set that may be the output of a subsequent cutting operation.

FIG. 1C shows a graphical schematic 100C including three relationship sub-clusters—sub-cluster 125 comprising members ABCDE, sub-cluster 135 comprising members GHI, and sub-cluster 140 comprising member J. In the example of FIG. 1C, logical link 115 between members G and J was cut, for example based on a recursive operation of the cutting operation on sub-cluster 130 (FIG. 1B). The difference between an output such as FIG. 1B and an output such as FIG. 1C may depend upon the confidence of the G-J relationship, the calibrations selected in the system (e.g., a strong preference for no false-positive relationships, and/or a strong preference for not missing any potential positive relationships, etc.), the priorities of the system implementer or a client for the data, and/or the purpose of creating the clusters of the members/nodes.

An example procedure includes resolving the relationship set by identifying a relationship name value for each of the sub-clusters (or clusters) generated by the relationship comparison operation. For example, where the relationship value list is based upon a company name, the sub-clusters may each be related to a specific company. In certain embodiments, the sub-clusters may be related to a primary key type of identifier (e.g., a value created to ensure that entities are uniquely identified), a textual name of the entity (e.g., derived from a most descriptive name generated by the data within the members, related to a table of entities previously stored in the system, and/or combinations such as creating a new name or primary key to append to table if a previously stored match cannot be found). In certain embodiments, a list may be known (e.g., countries) or unknown (e.g., generated from the member data), and closed (e.g., newly created names are disallowed) or open (e.g., the name list may be expanded), and/or combinations of these (e.g., closed with an alert, prompt, or other operation if a new member is discovered, allowing an operator or authorization algorithm to permit the addition of a member, or for other action to be taken; and/or open but requiring some criteria such as a minimum number of transactions, clearance by an operator or authorization algorithm, or other criteria before a new member is created or appended).

In certain embodiments, the relationship set may include a hierarchy. For example, a cluster or sub-cluster determined by the relationship comparison operation may relate to a high-level relationship object, and further sub-clusters may be generated to lower-level relationship objects. In an example, a sub-cluster may relate to a high-level relationship object such as a parent company, and further sub-clusters may relate to subdivisions, affiliates, business units, or other lower level organizational levels within the parent company. Thus, a member may include a number of "entity names" or "relationship values", which may be hierarchical and/or parallel (e.g., ALPHA—ALPHA ELECTRONICS DIVISION; and/or ALPHA—US IMPORT). The hierarchical relationships may include entity hierarchy (e.g., parent-child companies), geographic hierarchy (e.g. —Country-port), and/or may include mixed hierarchies (e.g., September-ALPHA; ALPHA-US; ALPHA-Widget Type A, etc.). In certain embodiments, the same members or portions of the same members may be present in a first clustered relationship value set for a first purpose (e.g., to identify related entities) and in a second clustered relationship value set for a second purpose (e.g., to identify all imports by country). All described examples are non-limiting illustrations.

FIG. 2 is a flow diagram of a method 200 for resolving a relationship between objects. In some embodiments, method 200 is part of an entity resolution engine. In some embodiments, method 200 processes data from a group of objects (e.g., a set of transactions, shipping records, abstracted shipping records such as pseudo records created from shipping records, for example to divide a shipping record up into logical portions, etc.), and provides input to subsequent matching or clustering (e.g., bootstrapped entity resolution) operations. In the matching case, the source and target object groups may come from different domains. The goal is to discover which source objects match which target objects. Matching operations are discussed in more detail below with respect to FIG. 3.

In the clustering case, the source and target object groups come from the same domain, though in general the source group may be a subset of the target group. The goal of the clustering case is to group the target objects together and create new entity objects from the clusters. Clustering operations are discussed in more detail below with respect to FIG. 4.

Method 200 includes generating (205) a target object index based on a group of target objects. For example, as described above, an index can be generated based on a group of target objects. The input to the target object indexing stage is a group of target objects, and its output is an index which is potentially distributed across a cluster. In some embodiments, a target object is a record comprising one or more of an identifier, and one or more matching attributes or related values, as described above. Each target object in the group of target objects will have at least one related value to another target object in the group. For example, a related value of a first target object can be a company name data value that matches to the company name data value of a second target object in the group of target objects.

Generating a target object index supports efficient similarity queries for subsequent lookup operations. In some embodiments, the target object index is a data structure such as a hash map over character n-grams or tokens.

In some embodiments, a target object comprises a partition key (e.g., country), and a separate index is created for each distinct value of the partition key. These partitioned indexes may be distributed across a computing cluster.

Method 200 includes performing (210) a cleaning operation on the at least one related value of each target object. For example, a cleaning or canonicalization operation can optionally be performed on the target objects' matching attributes (e.g., related values) prior to indexing. Examples include normalizing case and punctuation, or expanding common abbreviations. In some embodiments, a cleaning or canonicalization operation is performed on every data value of each target object in the group of target objects.

In some embodiments, a source object is a record comprising an identifier and data values, similar to a target object. Matching attributes in the source objects may be the same or may differ from those in the target objects. In some embodiments, a source object comprises a partition key.

Method 200 includes performing (215) a cleaning operation on one or more data values of each source object of a group of source objects. For example, a cleaning or canonicalization operation can optionally be performed on data values of the source objects. Examples include normalizing case and punctuation, or expanding common abbreviations. In some embodiments, a cleaning or canonicalization operation is performed on every data value of each source object in the group of source objects.

Method 200 includes a potential match generation stage which takes as input the target object index together with the group of source objects. The group of source objects may be partitioned and distributed across a cluster to an arbitrary degree. The output of this stage is a stream of potential matches which are (source, target) object pairs, as described in more detail below.

Method 200 includes performing (210), for each source object in a group of source objects, one or more lookup operations on each target object in the target object index. For example, for each source object, lookups are performed in the target object index to find similar target objects. In some embodiments, a source object is considered similar to a target object when one or more data values of the source object substantially match one or more data values of the target object.

Method 200 includes generating (225) a plurality of source target object pairs, each source target object pair comprising one source object and one target object having at least one matching data value. For example, the lookup operations yield a stream of potential matches which are (source, target) object pairs. The potentially-matching source target object pairs are processed further to determine whether they relate to the same object or entity.

Method 200 includes a potential match classification stage that takes as input the stream of (source, target) potential match pairs, and outputs a filtered substream of (source, target) matching pairs, each of which is augmented with a score. This can run in parallel over the input stream, as well as in a pipelined fashion with the previous potential match generation stage.

Method 200 includes converting (230) each source target object pair into a numeric feature vector. In some embodiments, the class of features includes one or more of a choice of matching attribute or data value (e.g. company name) from each of the two objects in the source target object pair, a string transformation function T, a string similarity function on the pair of transformed strings S. The overall feature is then a number f defined by f=S(T(source.attribute), T(target.attribute)). Many features may be generated based on combination of different choices available for each attribute, S, and T. These features may be pruned via a feature selection process performed at training time in order to improve the run time of this step, as described above. Other available options to reduce computational time include caching the outputs of T. Together, the final feature set generate a numeric feature vector from the (source, target) object pair.

Method 200 includes classifying (235) the numeric feature vector corresponding to each source target object pair using a binary classifier. In some embodiments, the binary classifier comprises a pretrained machine learning model based on one or more of a random forest method, logistic regression, a support vector machine, and a neural network. If supervised machine learning is used, the model is trained on a randomly-sampled data subset which has been run through indexing and match generation operations, as described above, and manually labeled.

Method 200 includes applying (240) a match score to each source target object pair based on the classification using the binary classifiers. For example, applying the classifier to the feature vector of a source target object pair to results in a numeric match score.

Method 200 includes discarding (245) any source target object pair having a match score lower than a match threshold value. For example, if the match score is above a threshold that has been selected at model training time, the match is accepted and output (together with its score) for further processing (e.g., by matching operations, clustering operations). Otherwise, the source target object pair is rejected and discarded.

The technology described herein can include a match ranking stage that accumulates the scored matches and resolves them into a final match state that will be persisted. FIG. 3 is a flow diagram of a method 300 for resolving a relationship between objects incorporating match ranking and conflict resolution, according to embodiments of the technology described herein. Method 300 can continue processing the source target object pairs that were not discarded at step 245 of method 200.

Method 300 includes ranking (305) the source target object pairs having a match score higher than the match threshold value based on match scores.

Method 300 includes selecting (310) a subset of the ranked source target object pairs based on a likelihood that the source object and the target object of each source target object pair of the subset are associated with the same object. For example, the described technology can support many-to-many, many-to-one, one-to-many, or one-to-one relations between the source and target objects. Defining many-to-one, one-to-many, and one-to-one relationships requires a ranking or voting algorithm over the scored match pairs output by the potential match generation stage described above. For many-to-one or one-to-many, the simplest approach is to take the max scoring match for each of the source (resp. target) objects. For one-to-one, a stable marriage algorithm or max-flow algorithm can be used, as described herein in the context of entity ID persistence.

Method 300 includes creating (315) a persistent entry for each source target object pair of the subset, each persistent entry indicating the likelihood that the source object and the target object are associated with the same object. In some embodiments, object or entity names, or other relationship values are made persistent, for example, they are maintained in a table or other data structure even if transactions are de-populated from the entity name or relationship value, including if the entity name or relationship value is empty of transactions or other related data values. Accordingly, for each of the selected source target object pairs, a value is included in the persistent entry indicating the likelihood that the source object and the target object are associated with the same object or entity (e.g., company).

The technology described herein can include a clustering stage that processes the scored matches potentially in parallel and outputs a set of object clusters, each of which may be operated on in parallel to seed or update new persistent entities or objects. It may be pipelined with the match classification stage.

FIG. 4 is a flow diagram of a method for resolving a relationship between objects incorporating clustering operations, according to embodiments of the technology described herein. Method 400 can continue processing the source target object pairs that were not discarded at step 245 of method 200.

The technology described herein can include operations for connected component decomposition. For example, method 400 includes populating (405) a disjoint set data structure with a plurality of entity objects, and ingesting (410) source target object pairs having a match score higher than the match threshold value. Method 400 further includes updating (415) the disjoint set data structure using a union-find algorithm on each source target object pair having a match score higher than the match threshold value.

As such, the described architecture supports incremental updating (given a previous set of connected components, the disjoint set can be reconstructed and new match pairs can be applied to it. This will yield the same result as if we had ingested all of the original match pairs+the new ones). The architecture also supports parallelization, i.e., each worker may consume a different subset of the scored match stream and build a different disjoint set. These completed partial disjoint sets may be converted back into a much smaller match stream and transmitted to other workers in a reduction tree. Ultimately a single worker will hold the complete disjoint set. The merging of partial disjoint sets is provably commutative and associative, which means it can be completed in any order across the cluster.

The described technology can include the following operations for cluster refinement that are performed across all connected components. In some embodiments, cluster refinement operations are performed by several servers or processors in parallel. In some embodiments, cluster refinement operations are only performed on connected components above a certain size threshold in order to save on computing time.

Method 400 includes generating (420) an edge weighting value for each source target object pair having a match score higher than the match threshold value based on the match score applied to the source target object pair. For example, the edge weightings can be derived from the classification score applied in connection with method 200 above, where higher-scoring edges will be more difficult or complex to cut.

Method 400 includes determining (425) a set of candidate cuts based on the edge weighting values, each candidate cut relating to one or more edges linking elements of the disjoint set data structure. For example, a candidate partition algorithm can be applied that will propose a set of edges to cut to divide the graph or member set into two components. In some embodiments, the candidate partition algorithm is at least one of Karger's algorithm, the Karger-Stein algorithm, and a spectral clustering algorithm. One of skill in the art will understand that other candidate partition algorithms can be used without departing from the scope of this disclosure.

Method 400 includes scoring (430) each candidate cut based on an expected error rate of the binary classifier, and performing (435) one of the candidate cuts based on a score assigned by the binary classifier being above a cut threshold value.

For example, each candidate cut is scored based on a scoring function. Parameters of the scoring function relate to expected error rates in the classifier operations of the potential match classification stage in connection with method 200, and can be calibrated accordingly. If the score is >0, the cut is accepted and performed, and the clustering operations recursively continue on each sub-cluster. Otherwise the cluster is output as a new entity object, as described below.

Method 400 includes creating (440) a plurality of sub-clusters, each sub-cluster comprising a subset of elements of the disjoint set data structure. Method 400 includes recursively (445) repeating the determining, scoring, and performing steps for each sub-cluster of the plurality of sub-clusters.

The technology described herein includes operations for entity creation. For example, method 400 includes defining (450) a new entity object for each sub-cluster based on a score assigned by the binary classifier being below the cut threshold value.

In certain embodiments, entity names or other relationship values are persistent, for example they are maintained in a table or other data structure even if transactions are de-populated from the entity name or relationship value, including if the entity name or relationship value is empty of transactions or other related data values. The persistence of entity names or other relationship values allows for efficient evaluation, for example, of past data that includes the persistent value. For example, if a company is acquired and transactions are re-mapped to a new name (e.g., the acquirer name, or a new name created for the company as-acquired), a reference to older data sets utilizing the previous name can be related to either the previous company name or the new company name (depending upon the purpose of checking the older data sets and/or the preferences of the client of the data). Additionally or alternatively, newly entered data (e.g., transaction records) that utilize the old name—for example erroneously or as a part of a transition process—can be mapped to the new name based on the match between the persistent value (e.g., the old name) and the new value. Additionally, the persistent value allows for management of an entity split, such as the formation of a spin-off company, sale of assets, or the like. In certain embodiments, a split results in the creation of a new identifier, where appropriate ones of the records associated with an entity are kept on the previous persistent identifier, and other records of the entity are associated with the new identifier. In certain embodiments, the records representing a majority of the transactions are kept on the previous identifier (e.g., even if an entity name changes, the previous identifier can be kept where the identifier is a primary key field or the like), and records having a minority of transactions are moved to the new identifier. Any other operations are possible, such as moving all records to new identifiers, and/or moving majority records to a new identifier. It will be seen that operations to move the minority transactions can result in lower resource utilization.

In certain embodiments, clusters of members to be split are matched according to a best match to other records of the entities that are receiving the clusters of the members. For example, although an official entity name change may have occurred, a user may be expecting a certain name type (which may be informally correct, anachronistic, a common mis-spelling or shorthand for the entity used by that user, and/or matched for comparison to previous records even though the entity name has officially changed or is distinct from the name utilized in the records), and a member cluster may be associated with that entity, according to the best match criteria, thereby providing the user with the expected entity naming convention and accordingly data that is useful to that user. In certain embodiments, best matching may be performed by an Edmonds-Karp algorithm (typically a maximum flow algorithm for a network—or maximizing node connectivity in the present example). In a further example, an adaptation of a maximum flow algorithm includes utilizing an initialization routine that performs a "greedy" maximization of preferences, such as node connectivity, certainty of connections, minimization of likely false positives, etc. In a still further example, scores are tracked over iterations of the maximum flow algorithm or adapted maximum flow algorithm, such that the algorithm can be stopped before completion if the score drops, improvement rate drops below a threshold value, etc. In certain embodiments, best matching may be performed by an alternate greedy preference maximization, alternating between old or previous entities and new or candidate entities until a stable solution (e.g., low sensitivity, maximum score values, fewest low-score values, elements from each set would not both have a different preferred entity, etc.) is determined to be found. In certain embodiments, an alternate greedy preference maximization algorithm is performed as an adapted solution to a stable-marriage problem.

In certain embodiments, the utilization of persistent identifiers allows for the re-mapping of entity related information at a later time or for a later purpose. For example, two entities that were previously treated separately may be merged at a later time—for example mapping both of the entities to a selected one of the entities, or to a newly created entity identity. The merged information can similarly be separated at a later time or when the data is analyzed for a different purpose. Thus, entity resolution processing can be separated from the user experience, allowing different users to see the entities in a distinct manner, or a same user to see the entities distinctly for different analysis purposes. Further, if an upgrade or improvement to the entity resolution operations occurs—for example as new information comes into the system and/or a machine learning algorithm improves over time and changes certain entity resolution outputs, a consistent view may be maintained for a viewer or user that was getting acceptable data previously.

In certain embodiments, link similarity determinations between members, and/or matches between clusters, may be determined in response to matching based on outside information beyond the member sets. For example, a member or cluster of members may utilize a particular supplier, a port or set of ports, a particular ship, a particular trajectory of transport (e.g., a list of countries), or other data outside of the members or member clusters that provide additional confidence that the matches are real positive matches. In certain embodiments, outside information beyond the member sets are utilized in response to a matching criteria where a high penalty or cost is associated with false positive matches. For example, it may be desirable for enforcement operations that a probability that a match is a real positive is high, and a false positive match may be detrimental to efficient enforcement operations. Additionally or alternatively, if a client for the data is seeking a few options (e.g., for a new supplier or shipper) but has a low cost associated with missing potential matches, then outside information beyond the member sets may be utilized to ensure that any matches generated are highly likely to be proper positive matches. Additionally or alternatively, outside information beyond the member sets may be utilized to determine candidate members for matching that may be missed by the similarity and difference determination operations—for example creating links between records where the nominal entity name does not match but external data indicate a likelihood of a relationship due to parallels in shippers, addresses, suppliers, etc. The determination of candidate members for matching from outside information beyond the member sets may be utilized where there is a low cost associated with a false positive entity match, and/or a high cost associated with a false negative entity match. While one degree of outside information is described in the example (e.g., checking members that have one or more outside information criteria directly shared), any number of degrees of outside information may be utilized, such as: members that use the same suppliers at the same addresses; members that use the same coding system at the same set of ports; members that use the same suppliers for the same ships with the same abbreviation conditions, etc.

An example procedure for performing and enabling semantic searches of entities, transaction records, and other data is described following. The example procedure includes an operation to accept a semantic search request, which may be a term, phrase, or a selection to search, and/or which may be a request to perform a semantic analysis of the data set.

The semantic search request may be provided by a user, by another process or procedure in a system, and/or a periodic or episodic request by the system—for example to keep an indexed semantic parser up to date.

The example procedure further includes an operation to perform a semantic hashing of the data set (or records)—for example shipping records, cleaned or processed shipping records, and/or members of a relationship value list. Example and non-limiting semantic hashing operations include performing a character-wise and/or word-wise hashing of the records or portions of the records, and/or creating word vector embeddings for the records. In certain embodiments, an autoencoder is utilized, for example to regenerate the original text and/or semantic terms based on a trained model, where the autoencoder operates on machine learning until the model generates the semantic terms matching the input. Accordingly, after training on numerous records, the same semantic model can work on numerous scripts and languages without re-training. In certain embodiments, the procedure includes training the semantic parser, such as by injecting noise into the training data set of the type experienced in actual transaction records, including at least missing characters, missing words, swapped words (in sentence order and/or improper data fields), inserted data (including useful additions, irrelevant additions, and/or erroneous additions), duplication of data, abbreviations (including abbreviation errors and noise of any type), removal of white space, and/or truncation (left, right, or middle) of data. The utilization of training the semantic parser with data that has had noise injected can reduce the training time for the semantic parser significantly, both in terms of time (e.g., the procedure does not have to wait for the appropriate amount of real data to be accumulated) and in terms of operational efficiency (e.g., the training data can efficiently exercise the noise space within fewer total data values than a real data set).

An example procedure further includes performing semantic parsing operations on a data set. An example semantic parsing operation includes structuring the data (e.g., dividing out the type of word data such as "product type", "medicine", "quantity", "product form", etc.), providing association rules between the structured data values, and/or bootstrapping ontologies in the data set (e.g., determining which words are special, such as "names", terms of art, abbreviations, etc.). In certain embodiments, an ontology may be from an explicit list, such as a chemical code database, pharmacological database, or the like. For example, a data record "Ibuprofen 200 mg tablet" may be parsed into "Ibuprofen" with metadata indicating "word, medicine", "200" with metadata indicating "number, quantity", "mg" with metadata indicating "unit of measure", and "tablet" with metadata indicating "product form." The parsing operation may further include associating the words, for example bound to a semantic term primary key, such that any of the terms (e.g., "200 mg") can be recognized in other contexts, such that the instance of 200 mg Ibuprofen tablets can be recognized in other contexts, and/or such that parallel terms (e.g., "Acetaminophen 325 mg capsule) can be recognized as the same type of object with differentiating specific values in one or more fields.

An example procedure further includes a semantic analysis operation that determines further insights from the semantic data. For example, a semantic analysis operation can be a data mining operation that breaks a body of text into various topics, for example tagging topics for later matching, similarity analysis, or reporting. In certain embodiments, missing data fields (through erroneous entry, damage to the record, or by design) can be reconstructed by mining identifiers. For example, an entity value (e.g., shipper, consigner, etc.) may be omitted from a record, and a UPC code portion identified from the semantic parsing may be utilized to reconstruct the actual entity value that was omitted from the record. Further examples include utilizing billing codes to ensure reporting of a shipment is the same in multiple countries, and/or to determine that a match in various countries is correct even though the records for the shipment in the various countries are cosmetically distinct (e.g., where countries have varying requirements or standard usage that varies in level of detail, required values to be entered, etc.). An example procedure further includes providing additional similarity matching and/or difference matching options for members of a relationship value list based on the terms determined from the semantic parsing. In certain embodiments, determinations can be made where the match is hidden or intended to be hidden—for example after an illicit importer of goods is determined, similarity matching based on the semantic parsing can determine other illicit importers of goods where the entity names may be intentionally changed or distinct.

An example semantic analysis operation includes a salience ranking determination. For example, a number of semantic terms that are important to, and/or that are associated frequently with, a company, country, port, or the like may be determined. The use of semantic terms that are important to an entity can be utilized to speed searches related to the entity, providing narrowing opportunities within the data before more complex search operations are performed. Additionally or alternatively, likely synonyms for various terms can be generated, ensuring that results of searches for various semantic terms are not overly narrow but still supporting efficient searching. In certain embodiments, synonyms may be scoped—for example "shoes" may be a synonym for "loafers" in certain contexts, but not in other contexts. Additionally or alternatively, semantic terms and/or synonyms may be context specific—for example certain terms may be utilized by an entity in one context (e.g., a specific country, product type, season, etc.) but not used as frequently by that entity in another context. Salience ranking determinations may be performed on a word-by-word basis, utilizing certain character strings (e.g., numeric sequences, root word portions, etc.), and/or utilizing short phrases. In certain embodiments, an autoencoder can generate a model which can abstract the semantic terms for utilization across languages and/or for varying contexts.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

Variations, modifications, and other implementations of what is described herein will occur to those of ordinary skill in the art without departing from the spirit and the scope of the invention. Accordingly, the invention is not to be limited only to the preceding illustrative descriptions.

What is claimed is:

1. A computer-implemented method for resolving a relationship between objects, the method comprising:
    generating a target object index based on a group of target objects;
    performing, for each source object in a group of source objects, one or more lookup operations on each target object in the target object index;
    generating a plurality of source target object pairs, each source target object pair comprising one source object and one target object having at least one matching data value;
    converting each source target object pair into a numeric feature vector;
    classifying the numeric feature vector corresponding to each source target object pair using a binary classifier;
    applying a match score to each source target object pair based on the classification using the binary classifier;
    discarding any source target object pair having a match score lower than a match threshold value;
    populating a disjoint set data structure with a plurality of entity objects;
    ingesting source target object pairs having a match score higher than the match threshold value;
    updating the disjoint set data structure using a union-find algorithm on each source target object pair having a match score higher than the match threshold value;
    generating an edge weighting value for each source target object pair having a match score higher than the match threshold value based on the match score applied to the source target object pair;
    determining a set of candidate cuts based on the edge weighting values, each candidate cut relating to one or more edges linking elements of the disjoint set data structure; scoring each candidate cut based on an expected error rate of the binary classifier; and
    performing one of the candidate cuts based on a score assigned by the binary classifier being above a cut threshold value;
    wherein performing one of the candidate cuts comprises:
        creating a plurality of sub-clusters, each sub-cluster comprising a subset of elements of the disjoint set data structure;
        recursively repeating the determining, scoring, and performing steps for each sub-cluster of the plurality of sub-clusters; and
        defining a new entity object for each sub-cluster based on a score assigned by the binary classifier being below the cut threshold value.

2. The computer-implemented method of claim 1 further comprising:
    ranking the source target object pairs having a match score higher than the match threshold value based on match scores;
    selecting a subset of the ranked source target object pairs based on a likelihood that the source object and the target object of each source target object pair of the subset are associated with the same object; and
    creating a persistent entry for each source target object pair of the subset, each persistent entry indicating the likelihood that the source object and the target object are associated with the same object.

3. The computer-implemented method of claim 1 wherein a plurality of server computing devices perform the recursively repeating step for the plurality of sub-clusters, each sub-cluster of the plurality of sub-clusters being operated on by a different server computing device substantially in parallel.

4. The computer-implemented method of claim 1 wherein determining a set of candidate cuts further comprises applying a candidate partition algorithm to the disjoint set data structure.

5. The computer-implemented method of claim 4 wherein the candidate partition algorithm is at least one of Karger's algorithm, the Karger-Stein algorithm, and a spectral clustering algorithm.

6. The computer-implemented method of claim 1 wherein each target object in the group of target objects comprises:
    a target object identifier; and
    at least one related value.

7. The computer-implemented method of claim 4 wherein each target object further comprises a target object partition key.

8. The computer-implemented method of claim 4 wherein the at least one related value matches a value of at least one other target object in the group of target objects.

9. The computer-implemented method of claim 4 further comprising performing a cleaning operation on the at least one related value of each target object.

10. The computer-implemented method of claim 9 wherein performing the cleaning operation further comprises one or more of normalizing the case of text, normalizing punctuation of text, and expanding abbreviations of text.

11. The computer-implemented method of claim 9 wherein the cleaning operation is performed prior to generating the index.

12. The computer-implemented method of claim 7 further comprising generating a separate index for each value of the partition key.

13. The computer-implemented method of claim 1 wherein each source object in the group of source objects comprises a source object identifier.

14. The computer-implemented method of claim 13 wherein each source object in the group of source objects further comprises a source object partition key.

15. The computer-implemented method of claim 1 wherein the binary classifier comprises a pretrained machine learning model based on one or more of a random forest method, logistic regression, a support vector machine, and a neural network.

16. The computer-implemented method of claim 1 further comprising performing a cleaning operation on one or more data values of each source object of a group of source objects.

* * * * *